(12) United States Patent
Ghat

(10) Patent No.: US 9,538,208 B2
(45) Date of Patent: Jan. 3, 2017

(54) HARDWARE ACCELERATED DISTRIBUTED TRANSCODING OF VIDEO CLIPS

(75) Inventor: Devadutta Ghat, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 1074 days.

(21) Appl. No.: 13/438,101

(22) Filed: Apr. 3, 2012

(65) Prior Publication Data

US 2013/0259138 A1    Oct. 3, 2013

(51) Int. Cl.

| | |
|---|---|
| *H04N 7/26* | (2006.01) |
| *H04N 21/234* | (2011.01) |
| *H04N 21/2343* | (2011.01) |
| *H04N 21/845* | (2011.01) |
| *H04N 19/42* | (2014.01) |
| *H04N 19/40* | (2014.01) |
| *H04N 19/436* | (2014.01) |

(52) U.S. Cl.
CPC ........ *H04N 21/23418* (2013.01); *H04N 19/40* (2014.11); *H04N 19/42* (2014.11); *H04N 21/234309* (2013.01); *H04N 21/8451* (2013.01); *H04N 19/436* (2014.11)

(58) Field of Classification Search
CPC ..................... H04N 21/23424; H04N 21/2343; H04N 19/40; H04N 19/42; H04N 19/436; H04N 21/23418; H04N 21/234309; H04N 21/8451

USPC .................................................... 375/240.25
See application file for complete search history.

(56) References Cited

U.S. PATENT DOCUMENTS

| | | | |
|---|---|---|---|
| 2007/0002946 A1* | 1/2007 | Bouton et al. | 375/240.01 |
| 2009/0180546 A1* | 7/2009 | Rodriguez et al. | 375/240.25 |

FOREIGN PATENT DOCUMENTS

| | | |
|---|---|---|
| CN | 101098483 A | 1/2008 |
| CN | 101459848 A | 6/2009 |
| CN | 102036043 A | 4/2011 |
| CN | 102123279 A | 7/2011 |

OTHER PUBLICATIONS

Holub et al. ("Distributed Encoding Environment based on Grids and IBP Infrastructure", Faculty of Informatics and Institute of computer Science, 2004, 10 pages, Herein after "Holub".*
Holub, et al. "Distributed Encoding Environment Based on Grids and IBP Infrastructure", Faculty of Informatics and Institute of Computer Science, 2004, 10 pages.

\* cited by examiner

*Primary Examiner* — William C Vaughn, Jr.
*Assistant Examiner* — Naod Belai
(74) *Attorney, Agent, or Firm* — Lynch Law Patent Group, P.C.

(57) ABSTRACT

Systems, apparatus, articles, and methods are described including operations for distributed transcoding of video clips.

26 Claims, 6 Drawing Sheets

HARDWARE ACCELERATED DISTRIBUTED TRANSCODING OF VIDEO CLIPS

BACKGROUND

Transcoding is the direct digital-to-digital data conversion of one encoding format to another encoding format. This may often be done in cases where a destination device does not support the source encoding format or has limited storage capacity that mandates a reduced file size.

Transcoding may typically be implemented as a two-step process. For example, such a two-step process may involve the original video clip being decoded to an intermediate uncompressed format that may then be encoded into the destination format. While it is usually preferable to use source code and recompile the application, there are times when doing so is either impractical or impossible.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
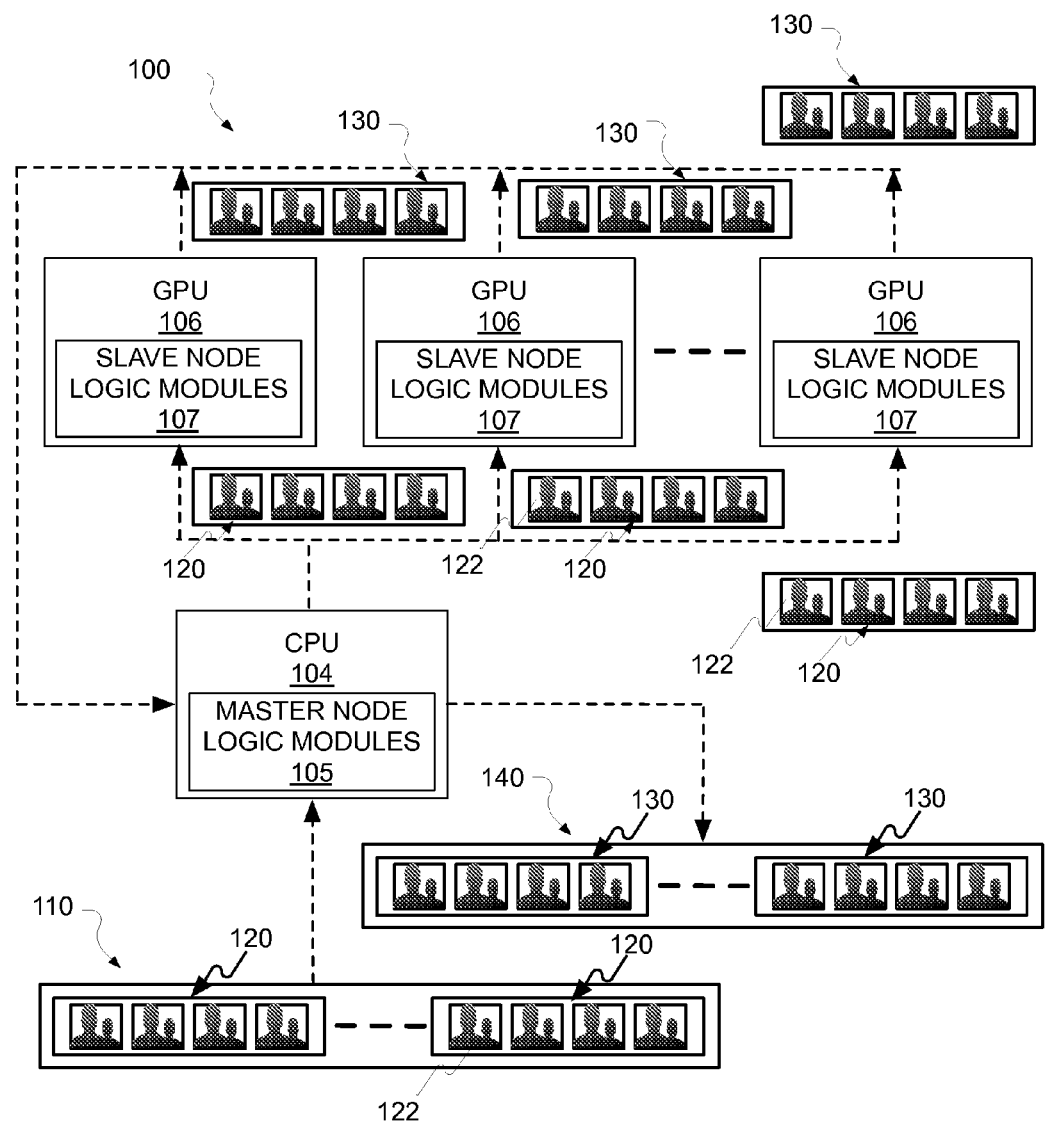
FIG. 1 is an illustrative diagram of an example transcoding system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for distributed transcoding of video clips.

As described above, in some cases, transcoding of video clips may be a computationally intensive process. Often, transcoding is performed primarily by a software based transcoder. Hardware based transcoders (e.g., Intel® Sandy Bridge processors) may operate two to ten times faster than software based transcoder solutions.

As will be described in greater detail below, operations for distributed transcoding of video clips may be sped up by splitting a video clip into multiple sub-clips. For example, such video clips may be split based at least in part on detection of instantaneous decoding refresh (IDR) picture flags, which may indicate a key picture. Many modern video formats may include IDR picture flags to indicate key pictures. These key pictures are independent of previous frames, meaning that all dependencies on previous frames are gone. Splitting at key picture locations (e.g., based on IDR picture flags) allows the video clip to be split in a lossless manner.

After splitting, the sub-clips may be distributed to multiple hardware based transcoders for transcoding. After transcoding, the transcoded sub-clips may be reassembled into a transcoded video clip for use by a destination device. For example, a transcoding process that utilized ten different hardware transcoders may speed up transcoding by as much as one hundred times as compared to non-distributed software based transcription.

FIG. 1 is an illustrative diagram of an example transcoding system 100, arranged in accordance with at least some implementations of the present disclosure. In the illustrated implementation, transcoding system 100 may include one or more central processing units (CPU) 104 and two or more graphics processing units (GPU) 106. In some examples, transcoding system 100 may include additional items that have not been shown in FIG. 1 for the sake of clarity. For example, transcoding system 100 may include memory, a router, network interface logic, etc. that have not been shown in FIG. 1 for the sake of clarity.

Graphics processing units 106 may be communicatively coupled to central processing unit 104. A master node logic modules 105 may be associated with central processing unit 104. Individual slave node logic modules 107 may be associated with individual graphics processing units 106.

In operation, master node logic modules 105 may receive a video clip 110 in a source format. Master node logic modules 105 may be configured to split video clip 110 into two or more sub-clips 120. For example, master node logic modules 105 may detect one or more instantaneous decoding refresh (IDR) picture flags 122 within an initial Network Abstraction Layer (NAL) access unit and perform the splitting operation at a Network Abstraction Layer (NAL) access unit that includes such an IDR picture flag 122.

Accordingly, use of the IDR picture flag 122 may permit splitting operations to be performed without decoding the entire NAL access unit. Such decoding of the NAL access unit might be required for data located at a level lower than the level occupied by the IDR picture flag 122. Further, use of the IDR picture flag 122 may permit splitting operations to be performed at a faster rate as compared to other splitting methods.

Master node logic modules 105 may distribute sub-clips 120 among two or more slave nodes 107 of a plurality of slave nodes. The individual nodes of the plurality of slave nodes may include transcoder hardware on graphics processing units 106. Slave node logic modules 107 may transcode individual sub-clips 120 from the source format into a destination format different from the source format.

Master node logic modules 105 may transfer a transcoded version 130 of the two or more sub-clips 120 to master node 105 from slave nodes 107. Master node logic modules 105 may merge transcoded sub-clips 130 into a transcoded video clip 140 for use by a destination device (not shown).

As will be discussed in greater detail below, transcoding system 100 may be used to perform some or all of the various functions discussed below in connection with FIGS. 2 and/or 3.

Figure 2:
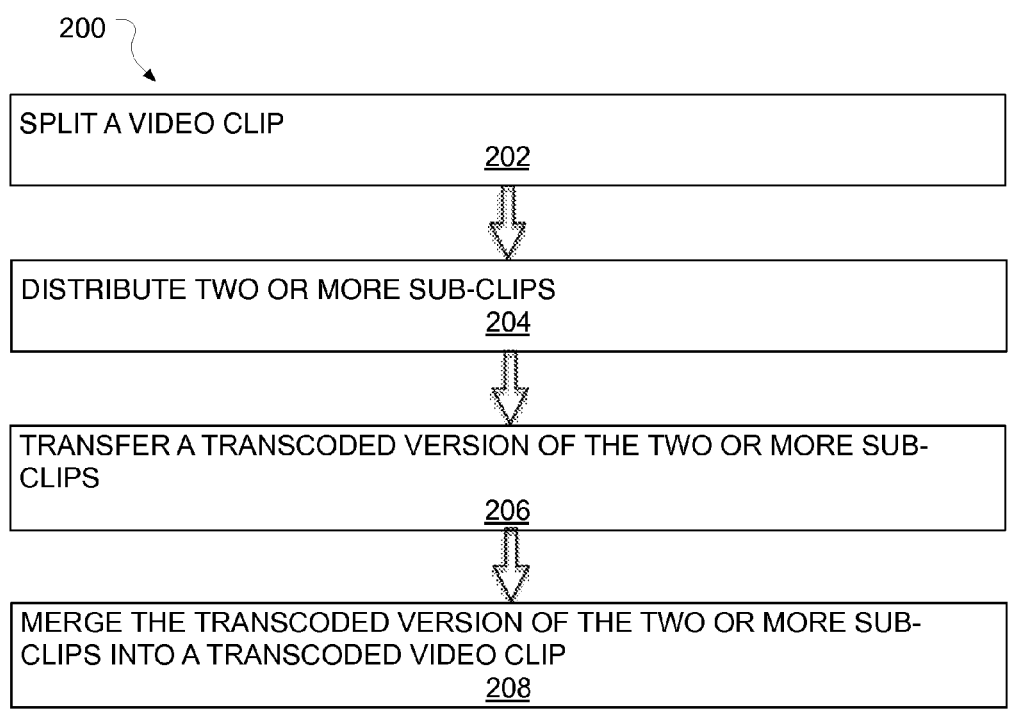
FIG. 2 is a flow chart illustrating an example transcoding process.

FIG. 2 is a flow chart illustrating an example transcoding process 200, arranged in accordance with at least some implementations of the present disclosure. In the illustrated implementation, process 200 may include one or more operations, functions or actions as illustrated by one or more of blocks 202, 204, 206, and/or 208. By way of non-limiting example, process 200 will be described herein with reference to example transcoding system 100 of FIGS. 1 and/or 4.

Process 200 may begin at block 202, "SPLIT A VIDEO CLIP", where a video clip may be split. For example, the video clip may be split via a master node. The master node may split the video clip into two or more sub-clips that may be in a source format.

Processing may continue from operation 202 to operation 204, "DISTRIBUTE TWO OR MORE SUB-CLIPS", where the two or more sub-clips may be distributed. For example, the two or more sub-clips may be distributed via the master node. In some implementations, the two or more sub-clips may be distributed among two or more slave nodes of a plurality of slave nodes. The individual nodes of the plurality of slave nodes may include transcoder hardware on a graphics processing unit (GPU).

Processing may continue from operation 204 to operation 206, "TRANSFER A TRANSCODED VERSION OF THE TWO OR MORE SUB-CLIPS", where a transcoded version of the two or more sub-clips may be transferred. For example, the transcoded version of the two or more sub-clips may be transferred via the master node. In some implementations, the transcoded version of the two or more sub-clips may be transferred to the master node from the two or more slave nodes. The transcoded version may be formatted in a destination format different from the source format.

As used herein, the term "transfer" may refer either to a push-type transfer or a pull-type transfer. For example, in some implementations, the transcoded version of the two or more sub-clips may be pushed (e.g., a push-type transfer) by the slave nodes initiating sending such information to the master node. In other implementations, the transcoded version of the two or more sub-clips may be pulled (e.g., a pull-type transfer) from the slave nodes via a request initiated from the master node.

Processing may continue from operation 206 to operation 208, "MERGE THE TRANSCODED VERSION OF THE TWO OR MORE SUB-CLIPS INTO A TRANSCODED VIDEO CLIP", where the transcoded version of the two or more sub-clips may be merged into a transcoded video clip. For example, the transcoded version of the two or more sub-clips may be merged into a transcoded video clip via the master node. In some implementations, the transcoded two or more sub-clips may be merged into a transcoded video clip.

Some additional and/or alternative details related to process 200 may be illustrated in one or more examples of implementations discussed in greater detail below with regard to FIG. 3.

Figure 3:
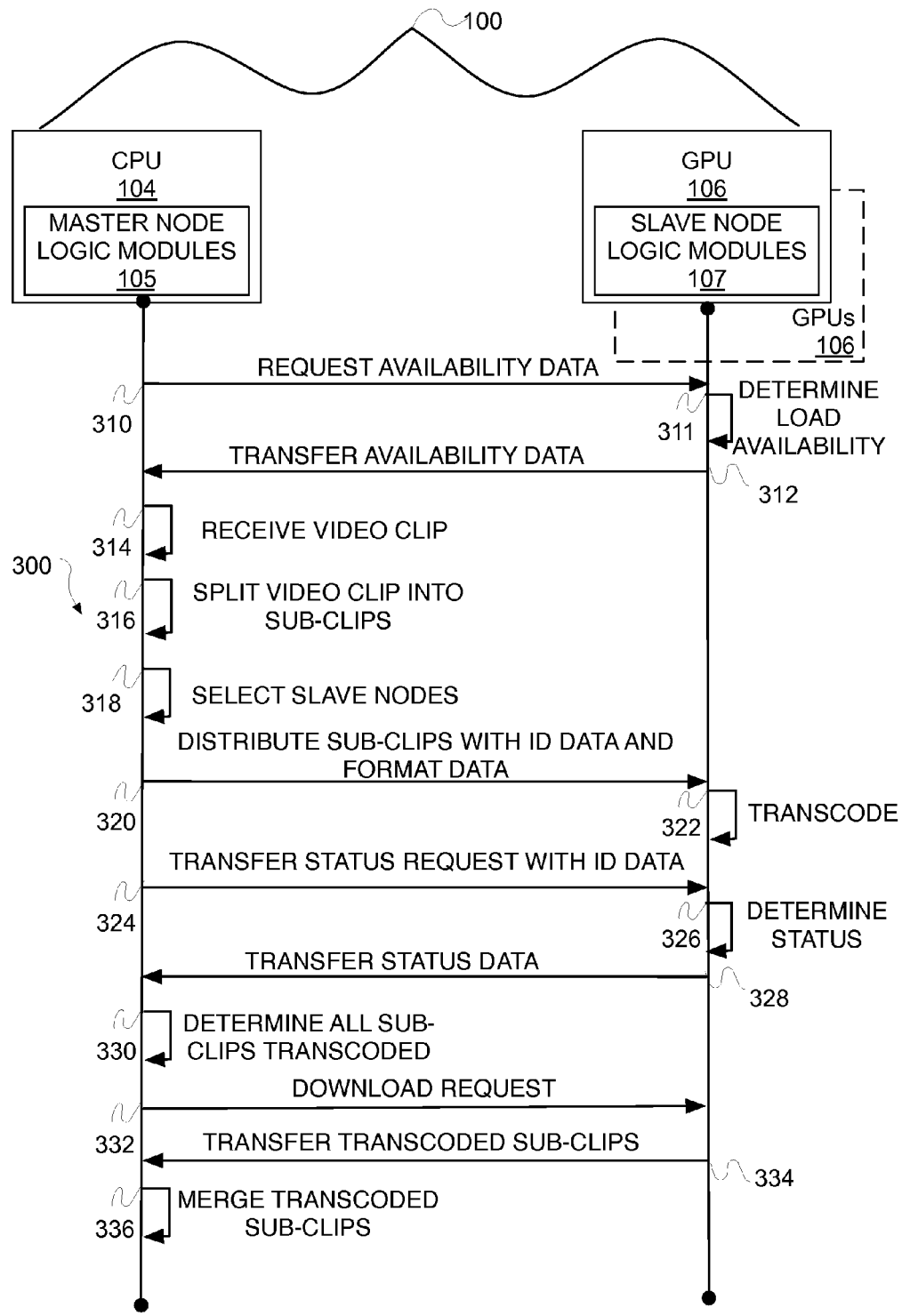
FIG. 3 is an illustrative diagram of an example transcoding system in operation.

FIG. 3 is an illustrative diagram of example transcoding system 100 and transcoding process 300 in operation, arranged in accordance with at least some implementations of the present disclosure. In the illustrated implementation, process 300 may include one or more operations, functions or actions as illustrated by one or more of actions 310, 311, 312, 314, 316, 318, 320, 322, 324, 326, 328, 330, 332, 334, and/or 336. By way of non-limiting example, process 300 will be described herein with reference to example transcoding system 100 of FIGS. 1 and/or 4.

In the illustrated implementation, transcoding system 100 may include CPU 104 associated with master node logic modules 105 and/or two or more GPUs 106 associated with slave node logic modules 107, the like, and/or combinations thereof. Although transcoding system 100, as shown in FIG. 3, may include one particular set of blocks or actions associated with particular modules, these blocks or actions may be associated with different modules than the particular module illustrated here.

Process 300 may begin at block 310, "REQUEST AVAILABILITY DATA", where availability data may be requested. For example, in some implementations, the availability data may be pushed (e.g., a push-type transfer) by slave node logic modules 107 initiating sending such information to master node logic modules 105. In other implementations, the availability data may be pulled (e.g., a pull-type transfer) from slave node logic modules 107 via a request initiated from master node logic modules 105.

Processing may continue from operation 310 to operation 311, "DETERMINE LOAD AVAILABILITY", where load availability may be determined. For example, availability data may include an indication of available load associated with individual nodes of the plurality of slave nodes. In some implementations, such availability data might indicate how many sub-clips are capable of being processed by an individual node overall and how many sub-clips are currently being processed, such availability data might indicate a percentage of load available, or the like.

Processing may continue from operation 311 to operation 312, "TRANSFER AVAILABILITY DATA", where availability data may be transferred. For example, availability data may be transferred from the plurality of slave nodes to the master node.

Processing may continue from operation 312 (or at any point prior to operation 312) to operation 314, "RECEIVE VIDEO CLIP", where a video clip may be received. For example the video clip may be received by the master node in response to a request initiated by a destination device for the video clip, where the video clip may be in a source format not suitable for the destination device.

Processing may continue from operation 314 to operation 316, "SPLIT VIDEO CLIP INTO SUB-CLIPS", where a video clip may be split. For example, the video clip may be split via master node logic modules 105. The master node may split the video clip into two or more sub-clips that may be in a source format.

In some examples, operation 314 may include determining a number of splits based at least in part on the size of the video clip. An estimated split location may be sought for an initial split location based at least in part on the determined number of splits. An instantaneous decoding refresh (IDR) picture flag may be detected within an initial Network Abstraction Layer (NAL) access unit nearest the initial preliminary split location. The splitting operation may be performed at the initial Network Abstraction Layer (NAL) access unit. A repetition of the seeking of the estimated split location, the detecting of the instantaneous decoding refresh (IDR) picture flag, and/or the performance of the splitting operation for one or more subsequent split locations may be performed based at least in part on the determined number of splits.

Processing may continue from operation 312 and/or operation 316 to operation 318, "SELECT SLAVE NODES", where slave nodes may be selected. For example, the two or more slave nodes may be selected from the plurality of slave nodes based at least in part on the availability data. In some examples, slave nodes with a relatively high availability will be selected while slave nodes with a relatively low availability will not be selected.

Processing may continue from operation 318 to operation 320, "DISTRIBUTE SUB-CLIPS WITH ID DATA AND FORMAT DATA", where the two or more sub-clips may be distributed. For example, the two or more sub-clips may be distributed via master node logic modules 105. In some implementations, the two or more sub-clips may be distributed among two or more slave nodes of a plurality of slave nodes. The individual nodes of the plurality of slave nodes may include transcoder hardware on GPU 106.

In some implementations, the two or more sub-clips may be distributed with unique identity (ID) data that may be utilized to uniquely distinguish one sub-clip from another sub-clip. Additionally or alternatively, two or more sub-clips may be distributed with destination format data associated with the individual sub-clips, which may indicate the destination format intended for the transcoding.

Processing may continue from operation 320 to operation 322, "TRANSCODE", where the individual sub-clips may be transcoded. For example, the two or more sub-clips may be transcoded, via the two or more slave nodes, from the source format into the destination format, as might be indicated by the destination format data. Such transcoding may be done in a parallel manner, where a first slave node may transcode a first sub-clip, a second slave node may transcode a second sub-clip, and so on.

Processing may continue from operation 322 to operation 324, "TRANSFER STATUS REQUEST WITH ID DATA", where a status request may be transferred, which may include identity (ID) data. For example, the status request from the master node may include identity (ID) data that may provide an indication of the particular sub-clip being inquired about.

Processing may continue from operation 324 to operation 326, "DETERMINE STATUS", where a status may be determined. For example, the determined status data may include an indication of transcoding completion associated with individual nodes of the plurality of slave nodes. Such status data may indicate a total amount of data transcoded, a percentage of transcoding completed, or the like.

Processing may continue from operation 326 to operation 328, "TRANSFER STATUS DATA", where the status data may be transferred. For example, the status data may be transferred from the plurality of slave nodes to the master node.

In some implementations, the status data may be pushed (e.g., a push-type transfer) by slave node logic modules 107 initiating sending such information to master node logic modules 105. In other implementations, the status data may be pulled (e.g., a pull-type transfer) from slave node logic modules 107 via a request initiated from master node logic modules 105.

Processing may continue from operation 328 to operation 330, "DETERMINE ALL SUB-CLIPS TRANSCODED", where a determination may be made as to whether all of the distributed sub-clips have been transcoded. For example, a determination may be made that all of the two or more sub-clips have been transcoded, by the master node, based at least in part on the status data.

Processing may continue from operation 330 to operation 332, "DOWNLOAD REQUEST", where a download request may be sent. For example, the download request may be sent from the master node to the selected slave nodes in response to the determination that all of the two or more sub-clips have been transcoded.

Processing may continue from operation 332 to operation 334, "TRANSFER TRANSCODED SUB-CLIPS", where a transcoded version of the two or more sub-clips may be transferred. For example, the transcoded version of the two or more sub-clips may be transferred via master node logic modules 105. In some implementations, the transcoded version of the two or more sub-clips may be transferred to master node logic modules 105 from two or more slave node logic modules 107. The transcoded version may be formatted in a destination format different from the source format.

In some implementations, the transcoded sub-clips may be pushed (e.g., a push-type transfer) by slave node logic modules 107 initiating sending such information to master node logic modules 105. In other implementations, the transcoded sub-clips may be pulled (e.g., a pull-type transfer) from slave node logic modules 107 via a request initiated from master node logic modules 105.

Processing may continue from operation 334 to operation 336, "MERGE TRANSCODED SUB-CLIPS", where the transcoded version of the two or more sub-clips may be merged into a transcoded video clip. For example, the transcoded version of the two or more sub-clips may be merged into a transcoded video clip via master node logic modules 105. In some implementations, the transcoded two or more sub-clips may be merged into a transcoded video clip.

In operation, process 300 may implement distributed transcoding of video clips by splitting a video clip into multiple sub-clips. For example, such video clips may be split based at least in part on detection of instantaneous decoding refresh (IDR) picture flags, which may indicate a key picture. These key pictures are independent of previous frames, meaning that all dependencies on previous frames are gone. Splitting at key picture locations (e.g., based on IDR picture flags) allows the video clip to be split in a lossless manner. After splitting, the sub-clips may be distributed to multiple hardware based transcoders for transcoding. After transcoding, the transcoded sub-clips may be reassembled into a transcoded video clip for use by a destination device. For example, a transcoding process that utilized ten different hardware transcoders may speed up transcoding by as much as one hundred times as compared to non-distributed software based transcription.

While implementation of example processes 200 and 300, as illustrated in FIGS. 2 and 3, may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks of FIGS. 2 and 3 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 2 and 3 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 4:
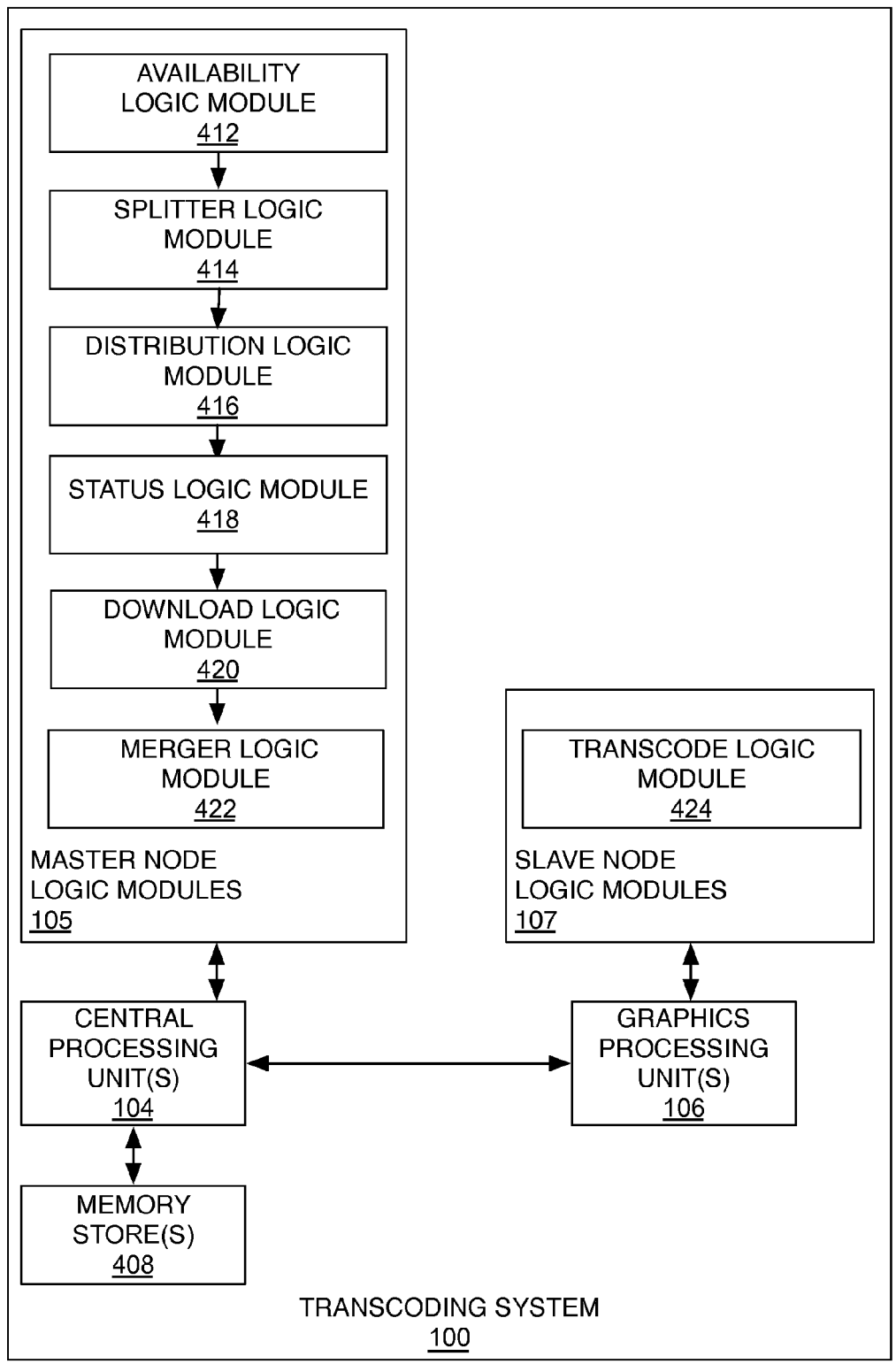
FIG. 4 is an illustrative diagram of an example transcoding system.

FIG. 4 is an illustrative diagram of an example transcoding system 100, arranged in accordance with at least some implementations of the present disclosure. In the illustrated implementation, transcoding system 100 may include one or more central processing units 104 associated with master node logic modules 105, two or more graphics processing units 106 associated with slave node logic modules 107, and/or one or more memory stores 408. Master node logic modules 105 may include an availability logic module 412, a splitter logic module 414, a distribution logic module 416, a status logic module 418, a download logic module 420, a merger logic module 422, the like, and/or combinations thereof. Slave node logic modules 107 may include a transcode logic module 424 and/or the like.

As illustrated, central processing unit 104, graphics processing units 106, and/or memory store 408 may be capable of communication with one another and/or communication with portions of master node logic modules 105 and/or slave node logic modules 107. Although transcoding system 100, as shown in FIG. 4, may include one particular set of blocks or actions associated with particular modules, these blocks or actions may be associated with different modules than the particular module illustrated here.

In some examples, availability logic module 412 may be associated with central processing unit 104 and may be configured to receive, via the master node, availability data from a plurality of slave nodes, where the availability data may include an indication of available load associated with individual nodes of the plurality of slave nodes.

In some examples, splitter logic module 414 may be associated with central processing unit 104 and may be configured to split, via a master node, a video clip into two or more sub-clips in a source format. Splitter logic module 414 may be further configured to: determine a number of splits based at least in part on the size of the video clip; seek an estimated split location for an initial split location based at least in part on the determined number of splits; detect an instantaneous decoding refresh (IDR) picture flag within an initial Network Abstraction Layer (NAL) access unit nearest the initial preliminary split location; perform the splitting operation at the initial Network Abstraction Layer (NAL) access unit; and/or repeat the seeking of the estimated split location, the detecting of the instantaneous decoding refresh (IDR) picture flag, and/or the performance of the splitting operation for one or more subsequent split locations based at least in part on the determined number of splits.

In some examples, distribution logic module 416 may be associated with central processing unit 104 and may be configured to distribute, via the master node, the two or more sub-clips among two or more slave nodes of a plurality of slave nodes. In some implementations the individual nodes of the plurality of slave nodes may include transcoder hardware on the individual two or more graphics processing units 106. Distribution logic module 416 may be further configured to select, via the master node, the two or more slave nodes from the plurality of slave nodes based at least in part on the availability data. Distribution logic module 416 further may be configured to distribute unique identity data and destination format data associated with individual sub-clips of the two or more sub-clips.

In some examples, transcode logic module 424 may be associated with the two or more graphics processing units 106 and may be configured to transcode, via the two or more slave nodes, the two or more sub-clips from the source format into the destination format.

In some examples, status logic module 418 may be associated with central processing unit 104 and may be configured to: transfer, via the master node, status data from the plurality of slave nodes, where the status data may include an indication of transcoding completion associated with individual nodes of the plurality of slave nodes; determine that all of the two or more sub-clips have been transcoded based at least in part on the status data; request, via the master node, transfer of the transcoded version of the two or more sub-clips to the master node from the two or more slave nodes in response to the determination that all of the two or more sub-clips have been transcoded.

In some examples, download logic module 420 may be associated central processing unit 104 and may be configured to transfer, via the master node, a transcoded version of the two or more sub-clips to the master node from the two or more slave nodes, where the transcoded version is in a destination format different from the source format. The merger logic module may be associated with the one or more central processing units and may be configured to merge, via the master node, the transcoded two or more sub-clips into a transcoded video clip.

In various embodiments, splitter logic module 414 may be implemented in hardware, while software may implement availability logic module 412, distribution logic module 416, status logic module 418, download logic module 420, and/or merger logic module 422. For example, in some embodiments, splitter logic module 414 may be implemented by ASIC logic while availability logic module 412, distribution logic module 416, status logic module 418, download logic module 420, and/or merger logic module 422 may be provided by software instructions executed by logic such as central processing unit 104. However, the present disclosure is not limited in this regard and availability logic module 412, splitter logic module 414, distribution logic module 416, status logic module 418, download logic module 420, and/or merger logic module may be implemented by any combination of hardware, firmware and/or software. Similarly, all or portions of slave node logic modules 107 may be implemented by any combination of hardware, firmware and/or software. For example, all or portions of slave node logic modules 107 may be implemented by transcoder hardware on the individual graphics processing units 106 (e.g., via Intel® Sandy Bridge-type processors or the like). In addition, memory stores 408 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 408 may be implemented by cache memory.

Figure 5:
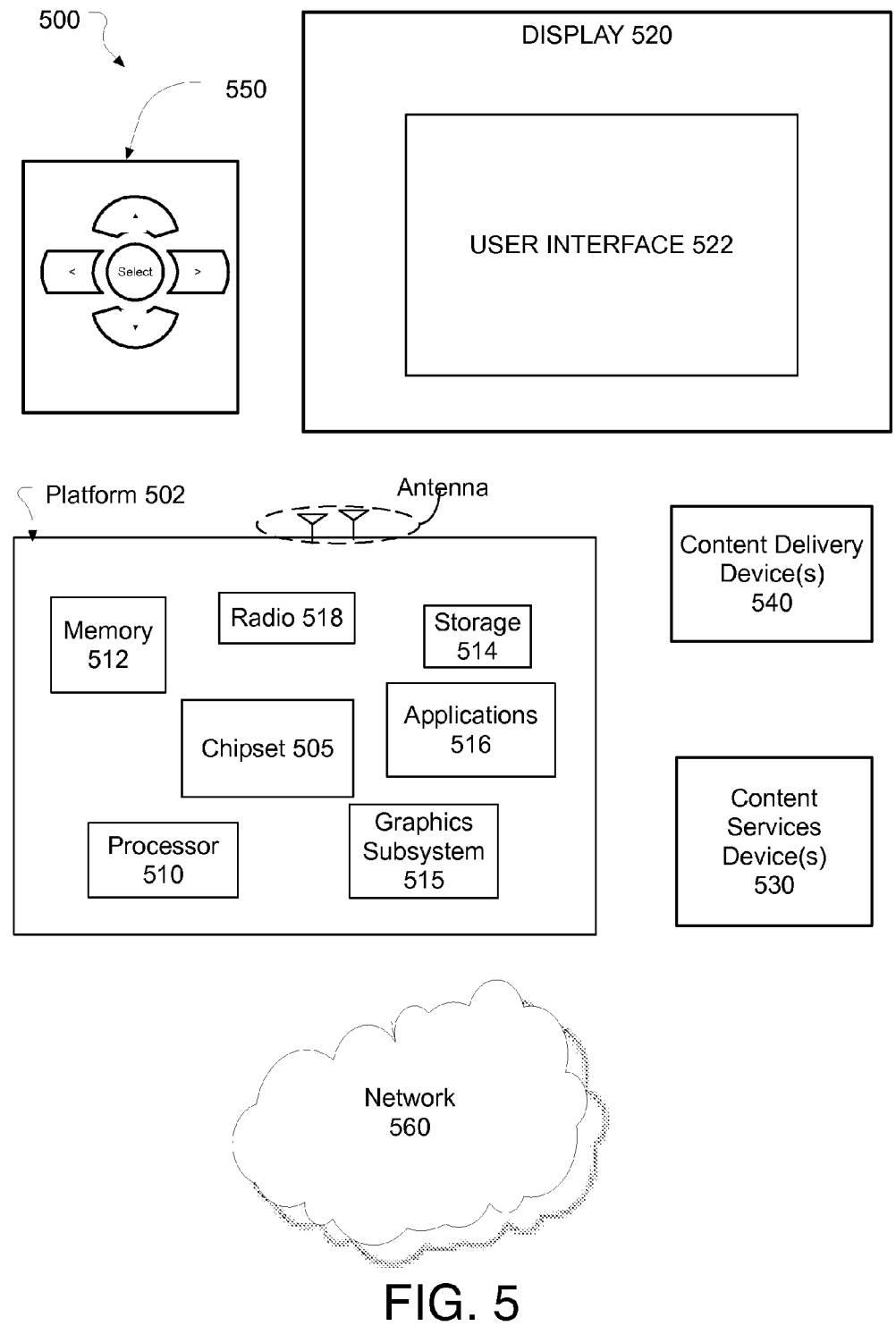
FIG. 5 is an illustrative diagram of an example system.

FIG. 5 illustrates an example system 500 in accordance with the present disclosure. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518.

For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 510 may be dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 may be integrated into processor 510 or chipset 505. In some implementations, graphics subsystem 515 may be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or display 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off." In addition, chipset 505 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
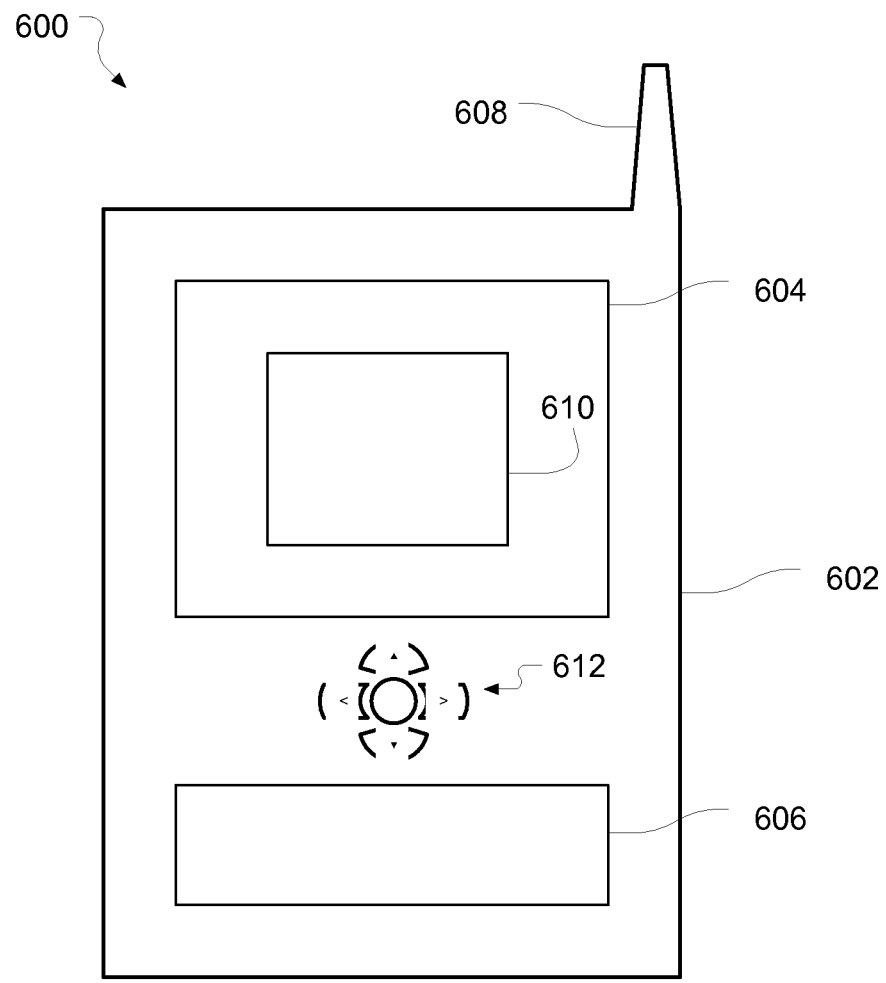
FIG. 6 is an illustrative diagram of an example system, all arranged in accordance with at least some implementations of the present disclosure.

As described above, system 500 may be embodied in varying physical styles or form factors. FIG. 6 illustrates implementations of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a housing 602, a display 604, an input/output (I/O) device 606, and an antenna 608. Device 600 also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for transcoding a video clip may include splitting, via a master node, the video clip into two or more sub-clips in a source format. The two or more sub-clips may be distributed among two or more slave nodes of a plurality of slave nodes, where individual nodes of the plurality of slave nodes may include transcoder hardware on a graphics processing unit (GPU). A transcoded version of the two or more sub-clips may be transferred to the master node from the two or more slave nodes, where the transcoded version is in a destination format different from the source format. The transcoded two or more sub-clips may be merged into a transcoded video clip.

In some examples, the method may include determining a number of splits based at least in part on the size of the video clip. An estimated split location may be sought for an initial split location based at least in part on the determined number of splits. An instantaneous decoding refresh (IDR) picture flag may be detected within an initial Network Abstraction Layer (NAL) access unit nearest the initial preliminary split location. The splitting operation may be performed at the initial Network Abstraction Layer (NAL) access unit. A repetition of the seeking of the estimated split location, the detecting of the instantaneous decoding refresh (IDR) picture flag, and/or the performance of the splitting operation for one or more subsequent split locations may be performed based at least in part on the determined number of splits. Availability data may be transferred from the plurality of slave nodes, where the availability data may include an indication of available load associated with individual nodes of the plurality of slave nodes. The two or more slave nodes may be selected from the plurality of slave nodes based at least in part on the availability data. The two or more sub-clips may be transcoded, via the two or more slave nodes, from the source format into the destination format. Status data may be transferred from the plurality of slave nodes, where the status data may include an indication of transcoding completion associated with individual nodes of the plurality of slave nodes. A determination may be made that all of the two or more sub-clips have been transcoded based at least in part on the status data. A request may be made for the transfer of the transcoded version of the two or more sub-clips to the master node from the two or more slave nodes in response to the determination that all of the two or more sub-clips have been transcoded. The distributing, via the master node, of the two or more sub-clips may include distributing unique identity data and destination format data associated with individual sub-clips of the two or more sub-clips.

In other examples, a system for transcoding a video clip may include one or more central processing units, one or more memory stores, two or more graphics processing units, a splitter logic module, a distribution logic module, a download logic module, a merger logic module, the like, and/or combinations thereof. The one or more memory stores may be communicatively coupled to the central processing units. The two or more graphics processing units may be communicatively coupled to the central processing units. The splitter logic module may be associated with the one or more central processing units and may be configured to split, via a master node, the video clip into two or more sub-clips in a source format. The distribution logic module may be associated with the one or more central processing units and may be configured to distribute, via the master node, the two or more sub-clips among two or more slave nodes of a plurality of slave nodes, where individual nodes of the plurality of slave nodes may include transcoder hardware on the individual two or more graphics processing units. The download logic module may be associated with the one or more central processing units and may be configured to transfer, via the master node, a transcoded version of the two or more sub-clips to the master node from the two or more slave nodes, where the transcoded version is in a destination format different from the source format. The merger logic module may be associated with the one or more central processing units and may be configured to merge, via the master node, the transcoded two or more sub-clips into a transcoded video clip.

In some examples, the system may further include an availability logic module, a transcode logic module, a status logic module, the like, and/or combinations thereof. The splitter logic module may be further configured to: determine a number of splits based at least in part on the size of the video clip; seek an estimated split location for an initial split location based at least in part on the determined number of splits; detect an instantaneous decoding refresh (IDR) picture flag within an initial Network Abstraction Layer (NAL) access unit nearest the initial preliminary split location; perform the splitting operation at the initial Network Abstraction Layer (NAL) access unit; and/or repeat the seeking of the estimated split location, the detecting of the instantaneous decoding refresh (IDR) picture flag, and/or the performance of the splitting operation for one or more subsequent split locations based at least in part on the determined number of splits. The availability logic module may be associated with the one or more central processing units and may be configured to receive, via the master node, availability data from the plurality of slave nodes, where the availability data may include an indication of available load associated with individual nodes of the plurality of slave nodes. The distribution logic module may be further configured to select, via the master node, the two or more slave nodes from the plurality of slave nodes based at least in part on the availability data. The transcode logic module may be associated with the two or more graphics processing units and may be configured to transcode, via the two or more slave nodes, the two or more sub-clips from the source format into the destination format. The status logic module may be associated with the one or more central processing units and may be configured to: transfer, via the master node, status data from the plurality of slave nodes, where the status data may include an indication of transcoding completion associated with individual nodes of the plurality of slave nodes; determine that all of the two or more sub-clips have been transcoded based at least in part on the status data; request, via the master node, transfer of the transcoded version of the two or more sub-clips to the master node from the two or more slave nodes in response to the determination that all of the two or more sub-clips have been transcoded. The distribution logic module further may be configured to distribute unique identity data and destination format data associated with individual sub-clips of the two or more sub-clips.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for transcoding a video clip, comprising:
   splitting, via a master node, the video clip into two or more sub-clips in a source format based at least in part on detecting an instantaneous decoding refresh (IDR) picture flag within a Network Abstraction Layer (NAL) access unit while decoding only a portion of the Network Abstraction Layer (NAL);
   distributing, via the master node, the two or more sub-clips among two or more slave nodes of a plurality of slave nodes, wherein individual nodes of the plurality of slave nodes comprise transcoder hardware on a graphics processing unit (GPU);
   transferring, to the master node, a transcoded version of the two or more sub-clips to the master node from the two or more slave nodes, wherein the transcoded version is in a destination format different from the source format; and
   merging, via the master node, the transcoded two or more sub-clips into a transcoded video clip.

2. The method of claim 1, wherein the master node is associated with a central processing unit (CPU) and wherein individual nodes of the plurality of slave nodes are associated with individual graphics processing units (GPU).

3. The method of claim 1, wherein the splitting, via the master node, of the video clip comprises performing the splitting operation at an Network Abstraction Layer (NAL) access unit.

4. The method of claim 1, wherein the splitting, via the master node, the video clip comprises:
   determining a number of splits based at least in part on the size of the video clip;
   seeking an estimated split location for an initial split location based at least in part on the determined number of splits;
   detecting the instantaneous decoding refresh (IDR) picture flag within an initial Network Abstraction Layer (NAL) access unit that is nearest the initial preliminary split location;
   performing the splitting operation at the initial Network Abstraction Layer (NAL) access unit; and
   repeating the seeking of the estimated split location, the detecting of the instantaneous decoding refresh (IDR) picture flag, and the performance of the splitting operation for one or more subsequent split locations based at least in part on the determined number of splits.

5. The method of claim 1, further comprising:
transferring, via the master node, availability data from the plurality of slave nodes, wherein the availability data comprises an indication of available load associated with individual nodes of the plurality of slave nodes; and
selecting, via the master node, the two or more slave nodes from the plurality of slave nodes based at least in part on the availability data.

6. The method of claim 1, further comprising transcoding, via the two or more slave nodes, the two or more sub-clips from the source format into the destination format.

7. The method of claim 1, further comprising:
transferring, via the master node, status data from the plurality of slave nodes, wherein the status data comprises an indication of transcoding completion associated with individual nodes of the plurality of slave nodes;
determining that all of the two or more sub-clips have been transcoded based at least in part on the status data; and
requesting, via the master node, transfer of the transcoded version of the two or more sub-clips to the master node from the two or more slave nodes in response to the determination that all of the two or more sub-clips have been transcoded.

8. The method of claim 1, wherein the distributing, via the master node, of the two or more sub-clips comprises distributing unique identity data and destination format data associated with individual sub-clips of the two or more sub-clips.

9. The method of claim 1, further comprising:
determining, via the master node, a number of splits based at least in part on the size of the video clip;
seeking, via the master node, an estimated split location for an initial split location based at least in part on the determined number of splits;
detecting, via the master node, the instantaneous decoding refresh (IDR) picture flag within an initial Network Abstraction Layer (NAL) access unit that is nearest the initial preliminary split location;
performing the splitting operation, via the master node, at the initial Network Abstraction Layer (NAL) access unit;
repeating, via the master node, the seeking of the estimated split location, the detecting of the instantaneous decoding refresh (IDR) picture flag, and the performance of the splitting operation for one or more subsequent split locations based at least in part on the determined number of splits;
transferring, via the master node, availability data from the plurality of slave nodes, wherein the availability data comprises an indication of available load associated with individual nodes of the plurality of slave nodes;
selecting, via the master node, the two or more slave nodes from the plurality of slave nodes based at least in part on the availability data;
transcoding, via the two or more slave nodes, the two or more sub-clips from the source format into the destination format;
transferring, via the master node, status data from the plurality of slave nodes, wherein the status data comprises an indication of transcoding completion associated with individual nodes of the plurality of slave nodes;
determining, via the master node, that all of the two or more sub-clips have been transcoded based at least in part on the status data; and
requesting, via the master node, transfer of the transcoded version of the two or more sub-clips to the master node from the two or more slave nodes in response to the determination that all of the two or more sub-clips have been transcoded,
wherein the distributing, via the master node, of the two or more sub-clips comprises distributing unique identity data and destination format data associated with individual sub-clips of the two or more sub-clips.

10. A system for transcoding a video clip, comprising:
one or more central processing units;
one or more memory stores communicatively coupled to the central processing units;
two or more graphics processing units communicatively coupled to the central processing units;
a splitter logic module associated with the one or more central processing units and configured to split, via a master node, the video clip into two or more sub-clips in a source format based at least in part on detecting an instantaneous decoding refresh (IDR) picture flag within a Network Abstraction Layer (NAL) access unit while decoding only a portion of the Network Abstraction Layer (NAL);
a distribution logic module associated with the one or more central processing units and configured to distribute, via the master node, the two or more sub-clips among two or more slave nodes of a plurality of slave nodes, wherein individual nodes of the plurality of slave nodes comprise transcoder hardware on the individual two or more graphics processing units;
a download logic module associated with the one or more central processing units and configured to transfer, to the master node, a transcoded version of the two or more sub-clips to the master node from the two or more slave nodes, wherein the transcoded version is in a destination format different from the source format; and
a merger logic module associated with the one or more central processing units and configured to merge, via the master node, the transcoded two or more sub-clips into a transcoded video clip.

11. The system of claim 10, wherein the splitter logic module is configured to perform the splitting operation at an Network Abstraction Layer (NAL) access unit.

12. The system of claim 10, wherein the splitter logic module is further configured to:
determine a number of splits based at least in part on the size of the video clip;
seek an estimated split location for an initial split location based at least in part on the determined number of splits;
detect the instantaneous decoding refresh (IDR) picture flag within an initial Network Abstraction Layer (NAL) access unit that is nearest the initial preliminary split location;
perform the splitting operation at the initial Network Abstraction Layer (NAL) access unit; and
repeat the seeking of the estimated split location, the detecting of the instantaneous decoding refresh (IDR) picture flag, and the performance of the splitting operation for one or more subsequent split locations based at least in part on the determined number of splits.

13. The system of claim 10, further comprising:
an availability logic module associated with the one or more central processing units and configured to transfer, via the master node, availability data from the plurality of slave nodes, wherein the availability data comprises an indication of available load associated with individual nodes of the plurality of slave nodes; and
wherein the distribution logic module is further configured to select, via the master node, the two or more slave nodes from the plurality of slave nodes based at least in part on the availability data.

14. The system of claim 10, further comprising a transcode logic module associated with the two or more graphics processing units and configured to transcode, via the two or more slave nodes, the two or more sub-clips from the source format into the destination format.

15. The system of claim 10, further comprising: a status logic module associated with the one or more central processing units and configured to:
transfer, via the master node, status data from the plurality of slave nodes, wherein the status data comprises an indication of transcoding completion associated with individual nodes of the plurality of slave nodes;
determine that all of the two or more sub-clips have been transcoded based at least in part on the status data; and
request, via the master node, transfer of the transcoded version of the two or more sub-clips to the master node from the two or more slave nodes in response to the determination that all of the two or more sub-clips have been transcoded.

16. The system of claim 10, wherein the distribution logic module is further configured to distribute unique identity data and destination format data associated with individual sub-clips of the two or more sub-clips.

17. The system of claim 10, further comprising:
wherein the splitter logic module is further configured to:
determine a number of splits based at least in part on the size of the video clip;
seek an estimated split location for an initial split location based at least in part on the determined number of splits;
detect the instantaneous decoding refresh (IDR) picture flag within an initial Network Abstraction Layer (NAL) access unit that is nearest the initial preliminary split location;
perform the splitting operation at the initial Network Abstraction Layer (NAL) access unit;
repeat the seeking of the estimated split location, the detecting of the instantaneous decoding refresh (IDR) picture flag, and the performance of the splitting operation for one or more subsequent split locations based at least in part on the determined number of splits;
an availability logic module associated with the one or more central processing units and configured to receive, via the master node, availability data from the plurality of slave nodes, wherein the availability data comprises an indication of available load associated with individual nodes of the plurality of slave nodes;
wherein the distribution logic module is further configured to select, via the master node, the two or more slave nodes from the plurality of slave nodes based at least in part on the availability data;
a transcode logic module associated with the two or more graphics processing units and configured to transcode, via the two or more slave nodes, the two or more sub-clips from the source format into the destination format;
a status logic module associated with the one or more central processing units and configured to:
transfer, via the master node, status data from the plurality of slave nodes, wherein the status data comprises an indication of transcoding completion associated with individual nodes of the plurality of slave nodes;
determine that all of the two or more sub-clips have been transcoded based at least in part on the status data;
request, via the master node, transfer of the transcoded version of the two or more sub-clips to the master node from the two or more slave nodes in response to the determination that all of the two or more sub-clips have been transcoded; and
wherein the distribution logic module is further configured to distribute unique identity data and destination format data associated with individual sub-clips of the two or more sub-clips.

18. At least one non-transitory machine readable medium comprising a plurality of instructions that in response to being executed on a computing device, cause the computing device to perform the following operations, comprising:
splitting, via a master node, the video clip into two or more sub-clips in a source format based at least in part on detecting an instantaneous decoding refresh (IDR) picture flag within a Network Abstraction Layer (NAL) access unit while decoding only a portion of the Network Abstraction Layer (NAL);
distributing, via the master node, the two or more sub-clips among two or more slave nodes of a plurality of slave nodes, wherein individual nodes of the plurality of slave nodes comprise transcoder hardware on a graphics processing unit (GPU);
transferring, to the master node, a transcoded version of the two or more sub-clips to the master node from the two or more slave nodes, wherein the transcoded version is in a destination format different from the source format; and
merging, via the master node, the transcoded two or more sub-clips into a transcoded video clip.

19. The non-transitory machine readable medium of claim 18, wherein the master node is associated with a central processing unit (CPU) and wherein individual nodes of the plurality of slave nodes are associated with individual graphics processing units (GPU).

20. The non-transitory machine readable medium of claim 18, wherein the splitting, via the master node, of the video clip comprises performing the splitting operation at an Network Abstraction Layer (NAL) access unit.

21. The non-transitory machine readable medium of claim 18, wherein the splitting, via the master node, the video clip comprises:
determining a number of splits based at least in part on the size of the video clip;
seeking an estimated split location for an initial split location based at least in part on the determined number of splits;
detecting the instantaneous decoding refresh (IDR) picture flag within an initial Network Abstraction Layer (NAL) access unit that is nearest the initial preliminary split location;
performing the splitting operation at the initial Network Abstraction Layer (NAL) access unit; and repeating the seeking of the estimated split location, the detecting of the instantaneous decoding refresh (IDR) picture flag, and the performance of the splitting operation for one or more subsequent split locations based at least in part on the determined number of splits.

22. The non-transitory machine readable medium of claim 18, wherein the instructions, when executed, further result in:
    transferring, via the master node, availability data from the plurality of slave nodes, wherein the availability data comprises an indication of available load associated with individual nodes of the plurality of slave nodes; and
    selecting, via the master node, the two or more slave nodes from the plurality of slave nodes based at least in part on the availability data.

23. The non-transitory machine readable medium of claim 18, wherein the instructions, when executed, further result in transcoding, via the two or more slave nodes, the two or more sub-clips from the source format into the destination format.

24. The non-transitory machine readable medium of claim 18, wherein the instructions, when executed, further result in:
    transferring, via the master node, status data from the plurality of slave nodes, wherein the status data comprises an indication of transcoding completion associated with individual nodes of the plurality of slave nodes;
    determining that all of the two or more sub-clips have been transcoded based at least in part on the status data; and
    requesting, via the master node, transfer of the transcoded version of the two or more sub-clips to the master node from the two or more slave nodes in response to the determination that all of the two or more sub-clips have been transcoded.

25. The non-transitory machine readable medium of claim 18, wherein the distributing, via the master node, of the two or more sub-clips comprises distributing unique identity data and destination format data associated with individual sub-clips of the two or more sub-clips.

26. The non-transitory machine readable medium of claim 18, wherein the instructions, when executed, further result in:
    determining, via the master node, a number of splits based at least in part on the size of the video clip;
    seeking, via the master node, an estimated split location for an initial split location based at least in part on the determined number of splits;
    detecting, via the master node, the instantaneous decoding refresh (IDR) picture flag within an initial Network Abstraction Layer (NAL) access unit that is nearest the initial preliminary split location;
    performing the splitting operation, via the master node, at the initial Network Abstraction Layer (NAL) access unit;
    repeating, via the master node, the seeking of the estimated split location, the detecting of the instantaneous decoding refresh (IDR) picture flag, and the performance of the splitting operation for one or more subsequent split locations based at least in part on the determined number of splits;
    transferring, via the master node, availability data from the plurality of slave nodes, wherein the availability data comprises an indication of available load associated with individual nodes of the plurality of slave nodes;
    selecting, via the master node, the two or more slave nodes from the plurality of slave nodes based at least in part on the availability data;
    transcoding, via the two or more slave nodes, the two or more sub-clips from the source format into the destination format;
    transferring, via the master node, status data from the plurality of slave nodes, wherein the status data comprises an indication of transcoding completion associated with individual nodes of the plurality of slave nodes;
    determining, via the master node, that all of the two or more sub-clips have been transcoded based at least in part on the status data; and
    requesting, via the master node, transfer of the transcoded version of the two or more sub-clips to the master node from the two or more slave nodes in response to the determination that all of the two or more sub-clips have been transcoded,
    wherein the distributing, via the master node, of the two or more sub-clips comprises distributing unique identity data and destination format data associated with individual sub-clips of the two or more sub-clips.

* * * * *